(12) United States Patent
Wang et al.

(10) Patent No.: US 7,570,534 B2
(45) Date of Patent: Aug. 4, 2009

(54) ENQUEUE EVENT FIRST-IN, FIRST-OUT BUFFER (FIFO)

(75) Inventors: James Wang, Milpitas, CA (US); Zongjian Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 333 days.

(21) Appl. No.: 11/675,341

(22) Filed: Feb. 15, 2007

(65) Prior Publication Data

US 2008/0198671 A1    Aug. 21, 2008

(51) Int. Cl.
*G11C 7/00*    (2006.01)
*G06F 3/00*    (2006.01)
*G06F 5/00*    (2006.01)
*G06F 13/36*    (2006.01)

(52) U.S. Cl. ............ 365/221; 365/189.15; 365/189.16; 365/189.2; 365/189.12; 710/52; 710/310

(58) Field of Classification Search ............ 365/189.05, 365/189.12; 710/52, 310
See application file for complete search history.

(56) References Cited

U.S. PATENT DOCUMENTS

| | | | |
|---|---|---|---|
| 4,864,496 A | 9/1989 | Triolo et al. | |
| 5,434,996 A | 7/1995 | Bell | |
| 5,754,614 A | 5/1998 | Wingen | |
| 5,951,635 A | 9/1999 | Kamgar | |
| 6,075,833 A | 6/2000 | Leshay et al. | |
| 6,480,942 B1 * | 11/2002 | Hirairi | 711/156 |
| 6,680,874 B1 | 1/2004 | Harrison | |
| 6,724,683 B2 | 4/2004 | Liao | |
| 6,725,388 B1 | 4/2004 | Susnow | |
| 6,956,776 B1 | 10/2005 | Lowe et al. | |
| 7,035,983 B1 | 4/2006 | Fensore | |
| 7,107,393 B1 | 9/2006 | Sabih | |
| 7,116,601 B2 | 10/2006 | Fung | |
| 2005/0128846 A1 * | 6/2005 | Momtaz et al. | 365/221 |
| 2006/0277329 A1 | 12/2006 | Paulson et al. | |
| 2007/0011368 A1 | 1/2007 | Wang | |
| 2007/0220184 A1 * | 9/2007 | Tierno | 710/52 |

OTHER PUBLICATIONS

Cummings, et al., "Simulation and Syntheses Techniques for Asynchronous FIFO Design with Asynchronous Pointer Comparisons," Sunburst Design, Inc., 2002, pp. 1-18.
James B. Keller, "The PWRficient Processor Family," PA Semi, Oct. 2005, 31 pages.

* cited by examiner

*Primary Examiner*—Ly D Pham
(74) *Attorney, Agent, or Firm*—Lawrence J. Merkel; Meyertons, Hood, Kivlin, Kowert & Goetzel, P.C.

(57) ABSTRACT

In one embodiment, an apparatus comprises a queue, write control logic coupled to the queue and operable in a write clock domain, and a first-in, first-out buffer (FIFO) coupled to the write control logic. The queue is configured to store a plurality of data items, wherein each data item has a type which is one of a plurality of types of data items that can be stored in the queue. The write control logic is configured to maintain write pointers that identify entries in the queue for each of the plurality of types. The write control logic is configured to update the write pointer corresponding to an input type for an input data item written to the queue. Additionally, the write control logic is configured to enqueue a write event in the FIFO to transport the enqueue event to a read clock domain different from the write clock domain.

19 Claims, 4 Drawing Sheets

ENQUEUE EVENT FIRST-IN, FIRST-OUT BUFFER (FIFO)

BACKGROUND

1. Field of the Invention

This invention is related to the field of digital circuits and, more particularly, to crossing clock boundaries in digital circuits.

2. Description of the Related Art

Electronic systems often have two or more different clock domains, corresponding to different clock signals used in the system. The clock signals that form different clock domains may have different sources, and thus a phase relationship between the clock signals may not be known. The clock signals may have different frequencies. In some cases, the clock signals may have both different sources and different frequencies. Different clock domains may exist on a single integrated circuit, between integrated circuits in a system, or both.

Generally, transmitting data across clock domain boundaries requires some sort of synchronization to ensure that data is safely and accurately captured in the receiving clock domain. First-in, first-out buffers (or more briefly, FIFOs) are frequently used to transfer data between clock domains. The transmitting clock domain writes data into the buffer using a write pointer. Subsequently, after the data is known to be stable in the FIFO, the receiving clock domain reads data from the FIFO. To prevent overrun when the FIFO is full, and to prevent underrun with the FIFO is empty, the FIFO control logic generates empty and full signals. The full signal is generated in the transmitting clock domain, and the empty signal is generated in the receiving clock domain. Typically, the full and empty signals are generated by comparing the read and write pointers. Similarly, detecting that there is data to be read from the buffer may be performed by comparing the read and write pointers. However, to compare the pointers, they must be transmitted between the clock domains.

To transfer pointers between the clock domains, the pointers can be gray-coded (in which at most one bit changes state between consecutive values). While gray-coding is relatively simple for a single pointer pair (read and write), it is far more complicated and difficult if the FIFO is divided into sections for different types of data. The pointers may begin and end on arbitrary boundaries in such a configuration. Moreover, if the size of the sections is programmable, the range of each pointer may be unpredictable until the programming occurs. Gray-coding such pointers would be extremely difficult, if not impossible.

In another mechanism, the pointers are transmitted between the clock domains by dual-rank synchronizing the pointers (also referred to herein as double synchronizing the pointers). A pair of clocked storage devices are coupled in series, in the clock domain that receives a pointer. An input to the series connection receives the pointer from the other clock domain. After passing through the series connection, the pointer is considered stable in the receiving clock domain and can be compared.

Double synchronizing is used to avoid metastability problems that may occur if setup/hold times are violated by a transition in the value of the pointer that is generated in the other clock domain. When such violations occur, the value captured by the clocked storage device may oscillate or an unpredictable value may be captured. Unfortunately, double synchronizing also introduces a two clock cycle latency in the clock domain to which the synchronization is performed. Additionally, at least one extra copy of the pointers is required as they pass through the double synchronization (assuming the second device in the synchronizer is directly used in the receiving clock domain). If there are numerous pointers, the hardware cost of the synchronization is large.

SUMMARY

In one embodiment, an apparatus comprises a queue, write control logic coupled to the queue and operable in a write clock domain, and a first-in, first-out buffer (FIFO) coupled to the write control logic. The queue is configured to store a plurality of data items, wherein each data item has a type which is one of a plurality of types of data items that can be stored in the queue. The write control logic is configured to maintain write pointers that identify entries in the queue for each of the plurality of types. The write control logic is configured to update the write pointer corresponding to an input type for an input data item written to the queue. Additionally, the write control logic is configured to enqueue a write event in the FIFO to transport the enqueue event to a read clock domain different from the write clock domain. A corresponding method is also contemplated. In one embodiment, the data items comprise commands.

BRIEF DESCRIPTION OF THE DRAWINGS

The following detailed description makes reference to the accompanying drawings, which are now briefly described.

Figure 1:
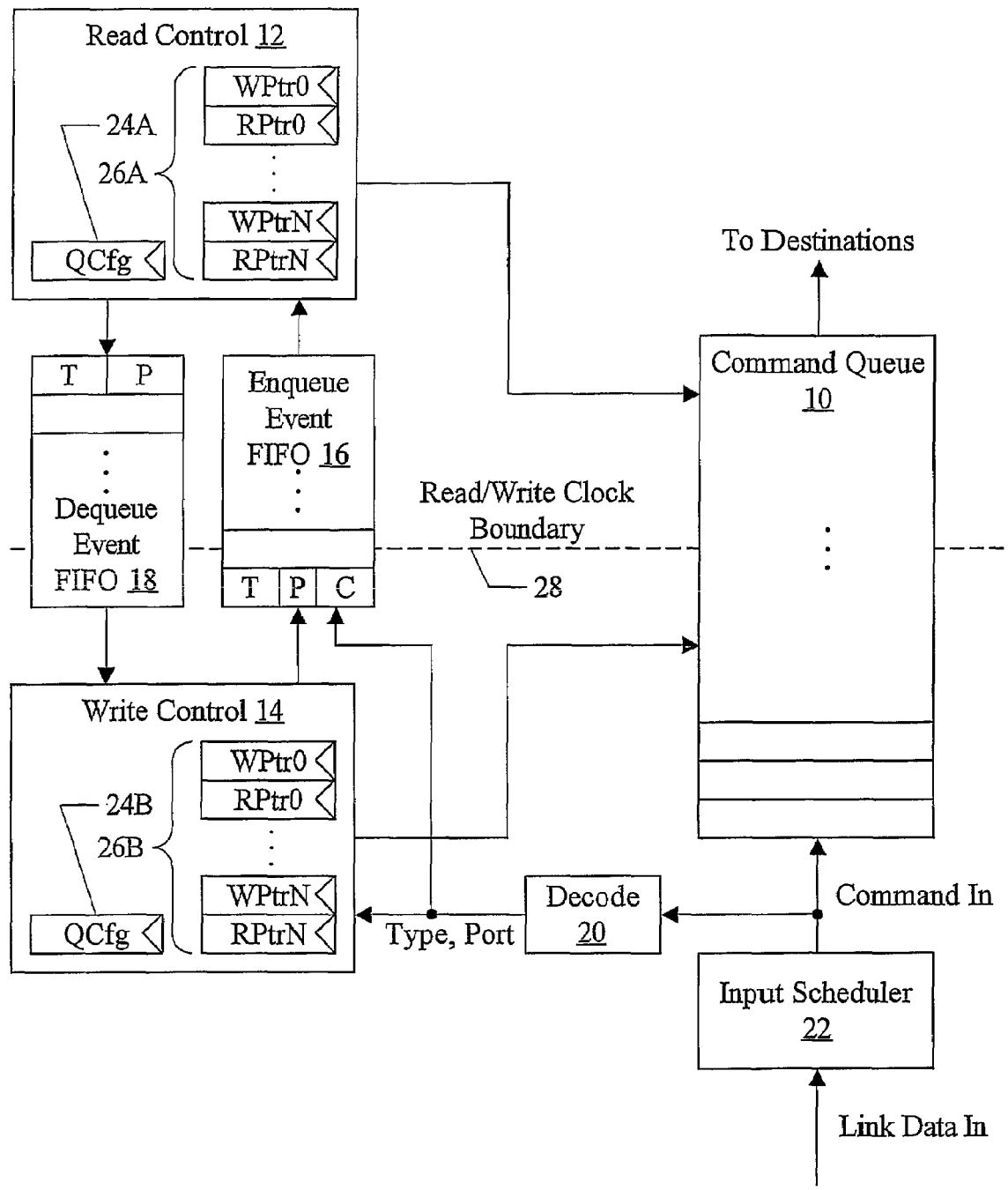
FIG. 1 is a block diagram of one embodiment of a command queue and related circuitry.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a command queue 10 and related circuitry is shown. The embodiment of FIG. 1 may be used to receive commands from a peripheral interface and to provide those commands to destination circuitry (e.g. a host with processors and a memory system, not shown in FIG. 1). The related circuitry includes read control logic 12, write control logic 14, an enqueue event FIFO 16, a dequeue event FIFO 18, a decode unit 20, and an input scheduler 22. The read control logic 12 is coupled to the command queue 10, the enqueue event FIFO 16, and the dequeue event FIFO 18. The read control logic 12 also includes one or more queue configuration (QCfg) registers 24A and sets of read and write pointers 26A. The write control logic 14 is also coupled to the command queue 10, the enqueue event FIFO 16, and the dequeue event FIFO 18. The write control logic 14 includes one or more queue configuration (QCfg) registers 24B and sets of read and write pointers 26B. The decode unit 20 is coupled to the input scheduler 22, and to the write control logic 14 and the enqueue event FIFO 16. The input scheduler 22 is coupled to the command queue 10 and to receive link data from the peripheral interface.

The link data may comprise commands received over one or more clock cycles from the peripheral interface. In one embodiment, the link may be divided into multiple ports, where different devices may be coupled to the different ports. For example, the peripheral interface may be the Peripheral Component Interconnect Express (PCIe) interface. In one particular embodiment, 16 lanes of PCIe interconnect may be provided, which may be configured into up to 4 ports in various configurations. Other embodiments may include more or fewer ports and/or more or fewer lanes. Other embodiments may use a different peripheral interface or other interface.

The read control logic 12 operates according to a read clock, in a read clock domain. The read clock domain may be the clock domain used by various destinations of the commands (e.g. a host that includes a memory system). The write control logic 14, decode unit 20, and input scheduler 22 operate according to a write clock, in a write clock domain. The write clock domain may be the clock domain used by the peripheral interface, or a clock domain that is closely associated with the peripheral interface clock domain. Generally, a clock domain may refer to the circuitry that is operated according the clock. That is, clocked storage devices in the clock domain are controlled by the clock or a clock that is derived from the clock in a deterministic fashion. The command queue 10, the enqueue event FIFO 16, and the dequeue event FIFO 18 cross the clock boundary, illustrated by the dotted line 28 in FIG. 1.

The command queue 10 may be used to store the received commands to safely cross the clock boundary to the read clock domain. The command set may be divided into several types. For example, the PCIe command set may be divided into posted commands, non-posted commands, and responses. The posted commands may comprise write requests for which no completion is provided. The issuer may consider the posted commands complete upon successful transmission of the commands. The non-posted commands may comprise read requests (which receive a data completion or error completion), and write requests for which a completion is provided to indicate successful completion or error. The completions may include the aforementioned completions to requests. Command sets may be divided into other command types (e.g. read, write, and other; division by port number; etc.). The command queue 10 may be a shared queue that is divided into sections for various command types. In some embodiments, the sections may be fixed. However, in the present embodiment, the sections are programmable in the QCfg registers 24A-24B. Allowing the sections to be programmable may permit fine tuning of the resources allocated for each section based on the expected workload, which may improve performance. The QCfg registers 24A-24B may be programmed with the base and extent of each section, the start and end of each section, etc. in various embodiments. QCfg register(s) 24A may store the same contents as QCfg register(s) 24B, each in its own clock domain. Alternatively, one set of QCfg register(s) may be provided if the apparatus shown in FIG. 1 is quiesced during changes to the QCfg register(s).

The write control logic 14 is configured to maintain a set of write and read pointers 26B, one read pointer and one write pointer for each of the sections in the command queue. For a PCIe interface as described above, there are three command types and up to four ports, so a total of 12 write pointers and 12 read pointers are maintained. For each section, the command queue entries between the read pointer and the write pointer are storing valid commands. Each section may be operated as a circular buffer in which the pointers wrap around from one end of the section to the other as they are updated. For example, the pointers may be advanced by either increment or decrement, and commands are written to and read from the queue. Accordingly, which entries are "between" the read and write pointers changes when one of the pointers wraps around and the other pointer has not. Various schemes may be used to handle the determination, generally involving an extra bit to trap wrap arounds. The pointers may cycle through entry numbers of the command queue 10 that are within the corresponding section. Alternatively, the pointers may cycle through offsets into the section (from offset 0 to offset N, where N+1 entries are allocated to the section). The entry number may be the sum of the base and the offset in such embodiments.

The read control logic 16 is also configured to maintain a set of read and write pointers 26A, one read pointer and one write pointer for each of the sections of the command queue. The read and write pointers 26A and the read and write pointers 26B are logically the same, although the timing of updates differs and thus the contents may differ temporarily when the contents of the queue are changing.

The write control logic 14 may provide the write pointers to the command queue 10 to direct the received commands to their designated entries in the command queue 10. In the illustrated embodiment, one command at a time is received into the command queue. The write control logic 14 may select the write pointer corresponding to the command type (and potentially port) to provide to the command queue 10, and may update the selected pointer (e.g. increment). Alternatively, the write control logic 14 may provide all of the write pointers to the command queue 10, which may write the command into the correct location. The write control logic 14 may receive the command type and port number for the command, and may update the corresponding pointer.

Since the read control logic 12 also maintains the write pointers (to locate valid entries in the command queue 10 to be read), the read control logic 12 also updates its write pointer for the command type/port number. Rather than attempting to double sync all write pointers to the read clock domain, the apparatus of FIG. 1 employs the enqueue event FIFO 16. The enqueue event FIFO 16 passes a write event, indicating that a command has been enqueued in the command buffer 10, over the clock boundary to inform the read control logic 12 of the event so that it may update the corresponding write pointer. The write event may identify the pointer to be updated in any fashion. In the present embodiment, for example, the write event may comprise the command type (T in the FIFO 16 in FIG. 1) and the port number (P in the FIFO 16 in FIG. 1). In embodiments not implementing multiple ports, the write event may simply be the command type. Alternatively, the write event may simply be the port number if command types are not separated for a given port (e.g. the port number may be a type). The amount of state passing over the clock boundary may be relatively small. Additionally, in one embodiment, the FIFO 16 may be relatively short (e.g. four or eight entries may suffice, depending on the expected variation of the read and write clocks). Thus, the pointers to the enqueue event FIFO 16 may be relatively small (a few bits), and may either be gray-coded or inexpensively transmitted over the clock domain boundary. For example, pointers to the FIFO 16 may be passed over the clock boundary using the mechanisms described in U.S. Patent Application Publication number 2007/0011368, filed on Jul. 7, 2005 and entitled "Digital Phase Relationship Lock Loop". The preceding patent application publication is incorporated herein by reference in its entirety. To the extent that the incorporated material and the material expressly set forth herein conflict, the material herein controls.

Since the read and write pointers do not cross the clock boundary, they needn't be gray-coded (e.g. they may have a simple binary representation). Pointer maintenance, even with the programmability of queue sections, may be simplified.

In one embodiment, the read control logic 12 may determine the number of credits needed for each command to be transmitted to its destination, and may read the command for transmission in response to determining the sufficient credits are available. Similar to the write control logic 14 description above, the read control logic 12 may provide the read pointer(s) to the command queue 10 to read the command from its entry. The read control unit 12 may also update the read pointer to indicate that the command has been removed from the command queue 10 (also referred to as "dequeuing" the command).

In one embodiment, to speed the transfer of commands in cases in which a given section is empty, the write control logic 14 may determine the number of credits needed to transmit a received command, and provide the credits in the enqueue event FIFO 16 as part of the event ("C" in the enqueue event FIFO 16). When the read control logic 12 receives the event from the FIFO, if the corresponding section was empty before the command was written and the specified number of credits are available, the read control logic 12 may transmit the command and dequeue the command upon receipt of the write event. The credit features are optional and may not be implemented in other embodiments.

The read control logic 12 may inform the write control logic 14 of a dequeue so that the write control logic 14 may update its read pointer. The dequeue event FIFO 18 may be used to transmit read events to the write control logic 14. The dequeue event FIFO 18 may be generally similar to the enqueue event FIFO 16, carrying read events to the write control logic 14. The read events may be similar to the write events, identifying the pointer to be updated (e.g. type and port number). No credit count need be provided, however.

The input scheduler 22 may reassemble the received link data into the commands from the various ports, and may transmit a command to the command queue 10 for storage. The input scheduler 22 may also provide the command to the decode unit 20, which may decode the command to determine a command type and port number (Type, Port in FIG. 1). One embodiment of the input scheduler 22 is shown in more detail below. In other embodiments, the input scheduler 22 may be eliminated and the command queue 10 may directly receive commands from the peripheral interface. In some cases, more than one command can be received concurrently from the multiple ports, and the command queue 10, write control logic 14, and enqueue event FIFO 16 may be configured to handle concurrent writing of more than one command. On the other hand, one embodiment of the input scheduler 22 may schedule the commands one at a time to the command queue 10. The command may include an indication of the port (e.g. the port number).

The command queue 10 may be formed of any sort of semiconductor storage. For example, the command queue 10 may comprise a random access memory (RAM). The command queue 10 may also comprise clocked storage devices (e.g. flops, registers, etc.) in the write clock domain. The written values may be known to be stable by the time the write event passes through the enqueue event FIFO 16 to the read control logic 10.

The read control logic 12 and the write control logic 14 may each comprise any desired logic circuitry to implement the operation described herein for the logic. The logic circuitry may be static, dynamic, a combination thereof, etc. The logic circuitry may include combinatorial logic, state machines, programmable logic, etc.

While the present embodiment handles commands in the command queue 10, generally any data items that cross a clock boundary may be handled in various embodiments using an apparatus similar to FIG. 1. The data items may be sorted into types, which may be assigned sections in the queue, and the write events may indicate the type.

Figure 2:
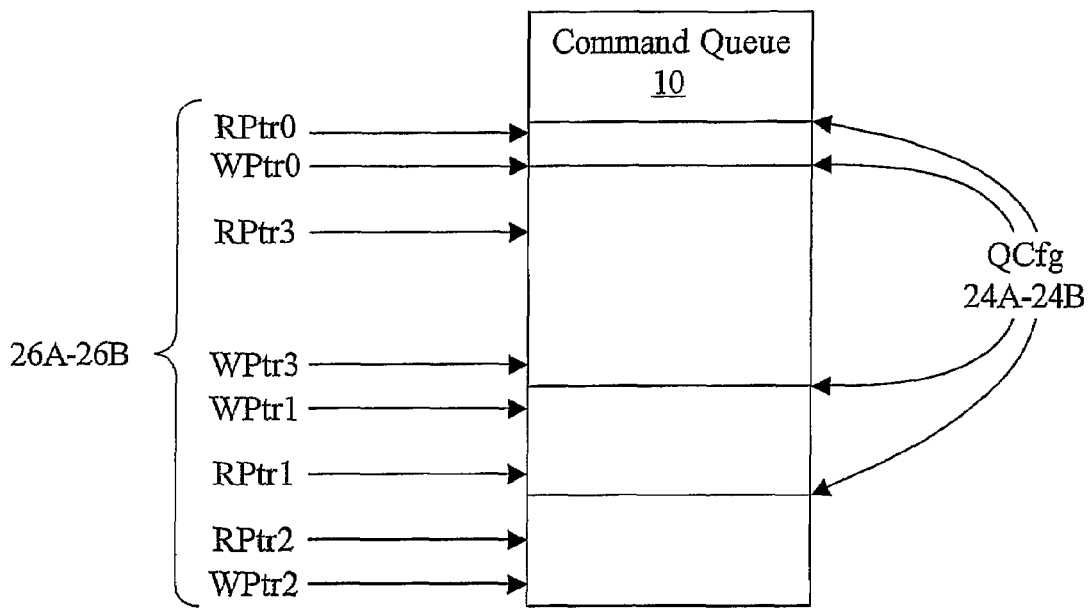
FIG. 2 is a block diagram illustrating one embodiment of the division of queues by types.

Turning now to FIG. 2, a block diagram of one embodiment of the command queue 10 is shown, illustrating the division of the command queue into sections for different command types and/or ports. The sections are delimited by horizontal lines in FIG. 2, where the sections are identified by programming the QCfg registers 24A-24B. Various read and write pointers are shown pointing to entries within each section (one read pointer and one write pointer per section). As can be seen in FIG. 2, sections of various sizes may be programmed. Also, as illustrated in FIG. 2, in some sections the read pointer is "above" the write pointer (e.g. RPtr0 and WPtr0) and in other cases the write pointer is "above" the read pointer (e.g. WPtr1 and RPtr1) due to the wrap around nature of operation. Additionally, in one embodiment, no particular order of the sections within the queue is required. Other embodiments may fix the order, even though the sections may be programmed with different sizes.

Figure 3:
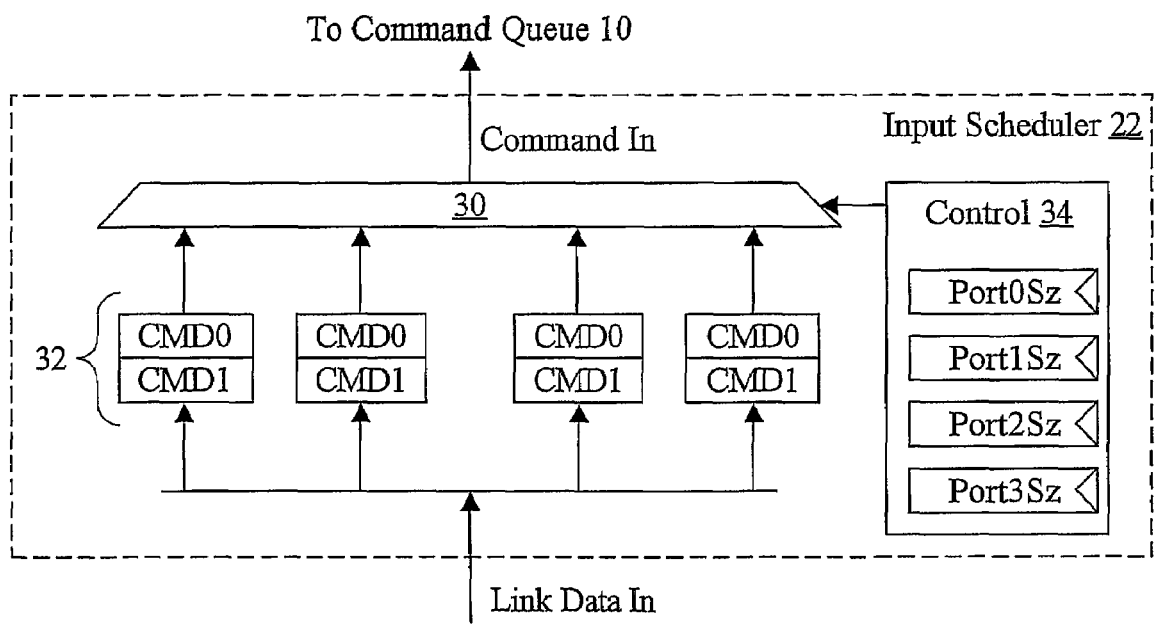
FIG. 3 is a block diagram of one embodiment of an input scheduler shown in FIG. 1.

FIG. 3 is a block diagram of one embodiment of the input scheduler 22. The input scheduler 22 includes a multiplexor (mux) 30, a pair of command buffers 32 (CMD0 and CMD1) per port, and a control unit 34. The command buffers 32 are coupled to receive the link data in, and are coupled to the mux 30. The mux 30 is coupled to provide the Command In to the command queue 10. The control unit 34 is coupled to the mux 30.

The input scheduler 22 may operate on the principle that the bandwidth input into the scheduler 22 is fixed (because the input link width is fixed), and on the fact that a given command is the same size independent of the width of the port on which it is received. Thus, the maximum number of commands that can be received per unit time is fixed, independent of the configuration.

The input scheduler 22 may reassemble commands for each port from the input link data, according to the link configuration. The control unit 34, for example, may include port size registers for each port, which may be programmed with the port configuration (enabled, disabled, width, etc.).

The input scheduler 22 may divide the scheduling for storage in the command queue 10 among the ports based on relative port sizes. That is, a first port that is twice as wide as a second port may be scheduled twice as often. Since a given command is fixed in size, the commands are received on the first port at a maximum rate that is twice the maximum rate of the second port. Accordingly, the commands may be reassembled in the command buffers 32 and scheduled for storage without command loss as long as the maximum bandwidth of commands across the entire link width can be satisfied by the input scheduler 22. By providing two command buffers 32 per port, flexibility in the scheduling may be provided since a temporary delay in scheduling the port to transmit one command will not lead to loss of any of the subsequent command (since it can be stored in the other buffer for that port).

Figure 4:
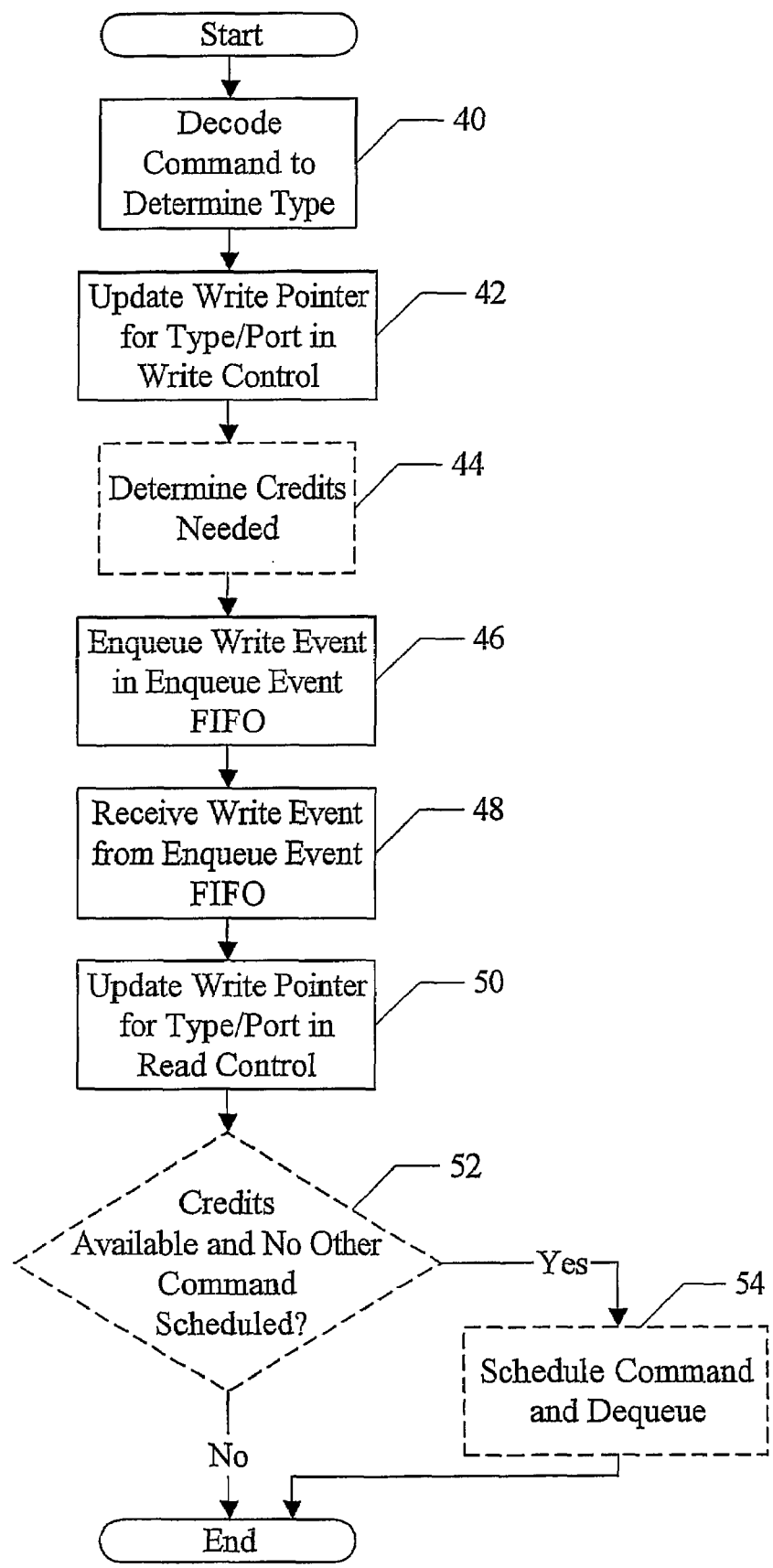
FIG. 4 is a flowchart illustrating operation of one embodiment of the circuitry shown in FIG. 1 in response to a command being presented for writing to the command queue.

Turning now to FIG. 4, a flow chart is shown illustrating operation of one embodiment of the apparatus shown in FIG. 1 in response to a command being presented to the command queue 10 for storage. While the blocks are shown in a particular order for ease of understanding, other orders may be used. Blocks may be performed in parallel in combinatorial logic in the apparatus. Blocks, combinations of blocks, and/or the flowchart as a whole may be pipelined over multiple clock cycles.

The decode unit 20 may decode the command to determine the type (and port number, if the port number is not separate from the command) (block 40). The write control logic 14 may update the write pointer corresponding to the identified type and port (block 42). In one embodiment, the update to the read and write pointers may be an increment for each command, wrapping to the lowest-addressed entry in the section when the end of the section is reached. In another embodiment, the update may be a decrement for each command, wrapping to the highest-addressed entry in the section when the end of the section reached.

For embodiments that transmit the credits needed for a given command in the enqueue event FIFO 16 with the type and port, the write control logic 14 may determine the number of credits needed for the command (block 44). The write control logic 14 may enqueue the write event in the enqueue event FIFO 16 (block 46). The read control logic 12 may receive the write event from the enqueue event FIFO 16 (block 48), one or more clock cycles after it is enqueued. The read control logic 12 may update the identified write pointer (block 50). Additionally, if the required credits are provided with the write event, the read control logic may determine if the credits are available and no other command is scheduled (e.g. the corresponding section of the command queue 10 is empty) (decision block 52). If so (decision block 52, "yes" leg), the read control logic 12 may schedule the command and generate a dequeue for the section (block 54).

Figure 5:
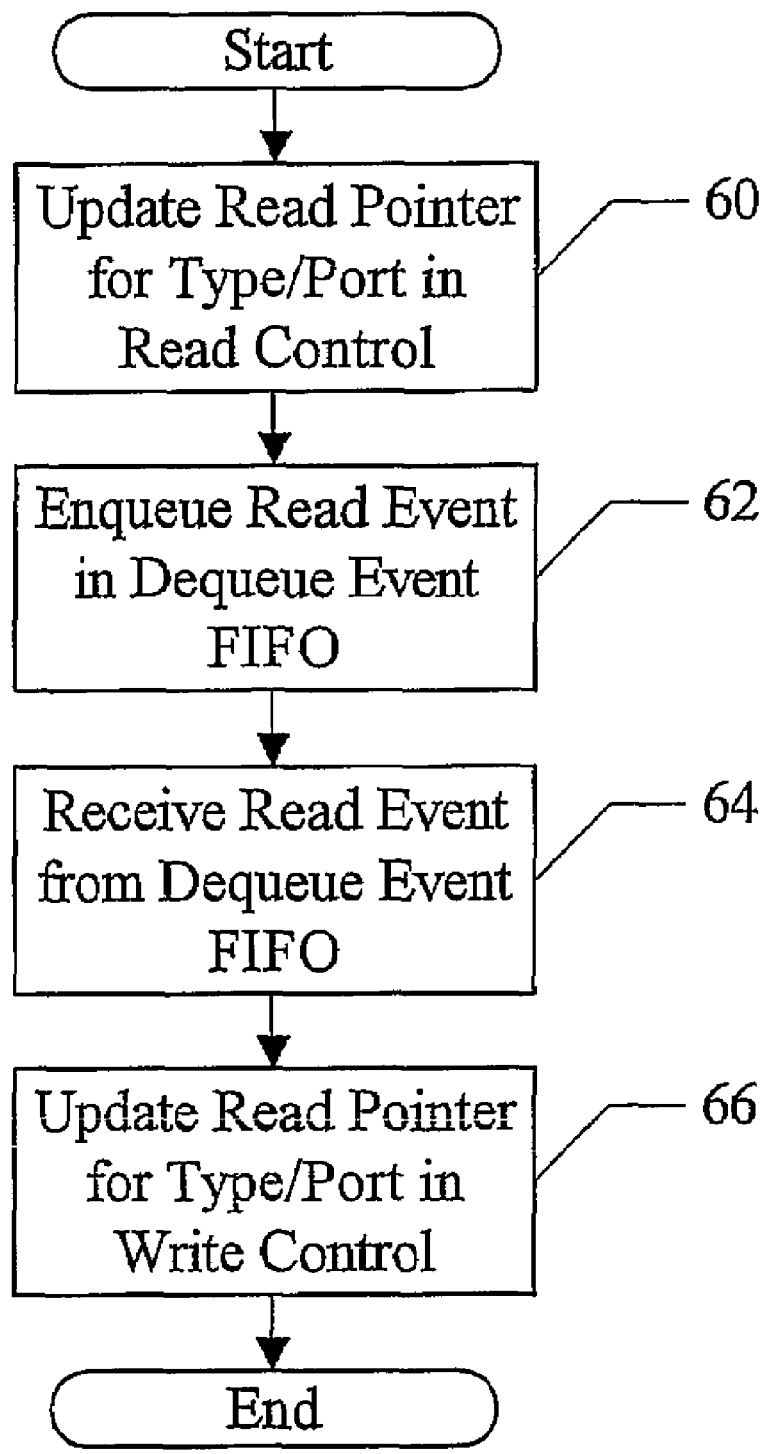
FIG. 5 is a flowchart illustrating operation of one embodiment of the circuitry shown in FIG. 1 in response to a command being read from the command queue.

FIG. 5 is a flowchart illustrating operation of one embodiment of the apparatus shown in FIG. 1 in response to a command being dequeued from the command queue 10 (e.g. in response to the write event, block 54 above, or in response to a later read of the command queue 10 to deliver the command to its destination). While the blocks are shown in a particular order for ease of understanding, other orders may be used. Blocks may be performed in parallel in combinatorial logic in the apparatus. Blocks, combinations of blocks, and/or the flowchart as a whole may be pipelined over multiple clock cycles.

The read control logic 12 may update the read pointer for the command (based on its type and port, in the present embodiment) (block 60). As mentioned above for write pointers, the update may be an increment or decrement for each command. The read control logic 12 may also enqueue a read event in the dequeue event FIFO 18 (block 62). The write control logic 14 may receive the read event from the dequeue event FIFO 18, one or more clock cycles after it is enqueued (block 64). The write control logic may update its read pointer (block 66).

Numerous variations and modifications will become apparent to those skilled in the art once the above disclosure is fully appreciated. It is intended that the following claims be interpreted to embrace all such variations and modifications.

What is claimed is:

1. An apparatus comprising:
a queue configured to store a plurality of data items, wherein each data item has a type which is one of a plurality of types of data items being stored in the queue;
write control logic coupled to the queue and configured to operate in a write clock domain, wherein the write control logic is configured to maintain one or more write pointers for each of the plurality of types, wherein the write pointers identify entries in the queue, and wherein the write control logic is configured to update the write pointer corresponding to an input type for an input data item written to the queue;
a first-in, first-out buffer (FIFO) coupled to the write control logic, wherein the write control logic is configured to enqueue a write event in the FIFO to transport the write event to a read clock domain different from the write clock domain; and
read control logic coupled to the FIFO and configured to operate in the read clock domain, wherein the read control logic is configured to maintain one or more second write pointers for each of the plurality of types, and wherein the read control logic is configured to update the second write pointer corresponding to the input type responsive to receiving the write event from the FIFO.

2. The apparatus as recited in claim 1 wherein the read control logic is configured to cause a read of a data item from the queue, and wherein the read control logic is configured to maintain second read pointers for each of the plurality of types, and wherein the read control logic is configured to update the second read pointer corresponding to an output type of the data item read from the queue.

3. The apparatus as recited in claim 2 further comprising a second FIFO coupled to the read control logic, wherein the read control logic is configured to enqueue a read event in the second FIFO responsive to the data item being read from the queue.

4. The apparatus as recited in claim 3 wherein the write control logic is coupled to the second FIFO to receive the read event, wherein the write control logic is configured to maintain read pointers corresponding to each of the plurality of types, and wherein the write control logic is configured to update a read pointer corresponding to the output type in response to receiving the read event from the second FIFO.

5. The apparatus as recited in claim 3 wherein the read event comprises the output type.

6. The apparatus as recited in claim 1 wherein the write control logic is configured to determine a number of credits consumed to transfer the input data item out of the queue, and wherein the write control logic is configured to enqueue the number of credits as part of the write event in the FIFO.

7. The apparatus as recited in claim 6 wherein the read control logic is configured to dequeue the input data item in response to receiving the number and the type in the FIFO if the number of credits is available and no other data item is scheduled from the queue.

8. The apparatus as recited in claim 1 wherein the write event comprises the input type.

9. The apparatus as recited in claim 8 wherein each of the plurality of data items comprises a command received from a peripheral interface, and wherein the plurality of types are command types.

10. The apparatus as recited in claim 9 wherein the plurality of command types comprise posted commands, non-posted commands, and completions.

11. The apparatus as recited in claim 9 wherein there are a plurality of ports on the peripheral interface, and wherein the write control logic is configured to maintain write pointers per port and per type, and wherein the write event further comprises an indication of the port.

12. A method comprising:
updating a write pointer in a write clock domain in response to an input data item being written to a queue configured to store a plurality of data items, wherein each data item has a type which is one of a plurality of types of data items that can be stored in the queue, and wherein the write pointer is one of a plurality of write pointers, the write pointer corresponding to an input type of the input data item and indicating an entry in the queue;
enqueuing a write event in a first-in, first-out buffer (FIFO) to transport the write event to a read clock domain different from the write clock domain, wherein the write event identifies the input type;
receiving the write event from the FIFO in the read clock domain; and
updating a second write pointer corresponding to the input type, the second write pointer being one of a plurality of second write pointers, each of which corresponds to one of the plurality of types.

13. The method as recited in claim 12 further comprising:
causing a read of a data item from the queue; and
updating a second read pointer corresponding to an output type of the data item read from the queue, the second read pointer being one of a plurality of second read pointers corresponding to the plurality of types.

14. The method as recited in claim 13 further comprising:
enqueuing a read event in a second FIFO;
receiving the read event in the write clock domain; and
updating a read pointer corresponding to the output type in response to receiving the read event in the write clock domain.

15. The method as recited in claim 12 further comprising:
determining a number of credits consumed to transfer the input data item out of the queue;
enqueuing the number as part of the write event in the FIFO; and
dequeuing the input data item in response to receiving the write event in the FIFO if the number of credits is available and no other data item is scheduled from the queue.

16. The method as recited in claim 12 wherein each of the plurality of data items comprises a command received from a peripheral interface, and wherein the plurality of types are command types.

17. The method as recited in claim 16 wherein there are a plurality of ports on the peripheral interface, and the plurality of write pointers are per port and per type, wherein the write event comprises the input type and the port number.

18. An apparatus comprising:
a queue configured to store a plurality of commands, wherein each command has a type which is one of a plurality of types;
a write control logic coupled to the queue and configured to operate in a write clock domain, wherein the write control logic is configured to maintain one or more write pointers for each of the plurality of types, wherein the write pointers identify entries in the queue, and wherein the write control logic is configured to update the write pointer corresponding to an input type for an input command written to the queue;
a first in, first out buffer (FIFO) coupled to the write control logic, wherein the write control logic is configured to enqueue a write event in the FIFO; and
read control logic coupled to the FIFO and operable in a read clock domain different from the write clock domain, wherein the read control logic is configured to maintain second write pointers for each of the plurality of types, and wherein the read control logic is configured to update a second write pointer corresponding to the input type responsive to receiving the write event from the FIFO.

19. An apparatus comprising:
a queue configured to store a plurality of commands, wherein each command is received on one of a plurality of ports;
write control logic coupled to the queue and configured to operate in a write clock domain, wherein the write control logic is configured to maintain one or more write pointers for each of the plurality of ports, wherein the write pointers identify entries in the queue, and wherein the read control logic is configured to update the write pointer corresponding to an input port for an input command written to the queue;
a first in, first out buffer (FIFO) coupled to the write control logic, wherein the write control logic is configured to enqueue a write event in the FIFO; and
read control logic coupled to the FIFO and operable in a read clock domain different from the write clock domain, wherein the read control logic is configured to maintain one or more second write pointers for each of the plurality of ports, and wherein the write control logic is configured to update a second write pointer corresponding to the input port responsive to receiving the write event from the FIFO.

* * * * *